United States Patent [19]

Strange

[11] 4,170,002

[45] Oct. 2, 1979

[54] SEISMIC SYSTEM USING A COMBINATION OF GENERICALLY DIFFERENT SOURCES

[75] Inventor: Booth B. Strange, Houston, Tex.

[73] Assignee: Western Geophysical Co. of America, Houston, Tex.

[21] Appl. No.: 923,850

[22] Filed: Jul. 12, 1978

Related U.S. Application Data

[63] Continuation-in-part of Ser. No. 734,919, Oct. 22, 1976, abandoned.

[51] Int. Cl.² .......................... G01V 1/04; G01V 1/38
[52] U.S. Cl. ...................................... 367/23; 181/111; 181/115
[58] Field of Search ........... 340/7 R, 9, 17 R, 15.5 R; 181/106, 111, 115; 73/6-8

[56] References Cited

U.S. PATENT DOCUMENTS

| 3,351,899 | 11/1967 | Luehrmann et al. | 340/7 R |
| 3,479,638 | 11/1969 | Rusnak | 340/15.5 CP |
| 3,539,983 | 11/1970 | Burg | 340/15.5 TG |
| 3,613,071 | 10/1971 | Quay | 340/7 R |
| 3,744,021 | 7/1973 | Todd | 340/7 R |

*Primary Examiner*—Nelson Moskowitz
*Attorney, Agent, or Firm*—William A. Knox

[57] ABSTRACT

In seismic exploration, particularly at sea, several seismic acoustic sources selected from different genera of such sources are combined in a single array. The several sources are fired substantially simultaneously so that the acoustic pulses from the several sources blend together to create a single composite seismic wave. The source genera are selected such that their initial impulses are in phase but their caudal transients are incoherent with respect to one another so that the initial impulse is enhanced at the expense of the after-pulses.

4 Claims, 5 Drawing Figures

SEISMIC SYSTEM USING A COMBINATION OF GENERICALLY DIFFERENT SOURCES

RELATION TO OTHER APPLICATIONS

This is a continuation-in-part of Application Ser. No. 734,919 now abandoned, filed Oct. 22, 1976, and assigned to the assignee of this invention.

BACKGROUND OF THE INVENTION

1. Technical Field of the Invention

This invention is concerned with the use of an array of generically different seismic acoustic sources to enhance the initial acoustic impulse at the expense of caudal transients.

2. Discussion of the Prior Art

The use of multiple seismic acoustic sources in seismic exploration on land and at sea is well known. Usually, a number of individual sources are grouped in an array of prescribed dimensions. One purpose of an array is to cancel undesired horizontally-travelling surface waves by destructive interference and to additively reinforce the downwardly-travelling acoustic wavefront from which reflected signals are derived. Typically, all of the seismic sources within a given array belong to the same genus although different species of sources, chosen from the same genus, may be employed.

For purposes of this disclosure, seismic acoustic sources that function according to the same operating principle are considered to fall within the same genus. Sources characterized by different sizes or designs, but having a common operating principle, are considered to be species within the genus. Thus, air guns belong to one genus, sparkers or arcers belong to another genus, imploders to a third, explosive-gas guns to a fourth genus and so on.

As is well known to geophysicists, the pressure signature, that is, a recording of pressure vs time of an outgoing acoustic signal, consists of a strong first impulse followed by a caudal pulse train or tail of weaker pulses. The pressure signatures attributable to sources selected from within any one genus, have similar patterns that are characteristic of that genus. The amplitudes and spacings-in-time of the caudal pulses generated by two species of sources from the same genus may vary a little bit with respect to each other. But the signal pressure-signature of the one species can be scaled such that it can be correlated, to a high degree of certainty, with the signal pressure-signature of another species of the same genus.

On the other hand, pressure signatures of acoustic signals emitted by seismic sources selected from different genera are completely incoherent with one another except for the first impulse. That is, the pressure signatures are not correlatable within any significant degree of certainty. Illustrations of the pressure signatures of signals emitted by various genera of seismic acoustic sources are shown in a handbook entitled "Seismic Energy Sources 1968 Handbook", edited by F. S. Kramer, R. A. Peterson and W. C. Walter, published by the United Geophysical Corporation, Division of Bendix, Pasadena, Calif.

The presence of a caudal pulse train following the initial impulse as generated by a seismic sound source, is very undesirable because each of the caudal pulses acts as a new impulse. The resulting seismic reflection recording becomes complex and difficult to interpret. Accordingly it is important that the initial impulse be enhanced and that the unwanted caudal pulses be suppressed.

As discussed above, use of a number of sources of the same genus, such as air guns, deployed in an array and fired simultaneoulsy or in a selected sequence, will additively reinforce the desired initial impulse. The various sources may be of different sizes so that the power or output signal strength of the respective sources varies according to some selected weighting function. As a result of weighting, the characteristics of the caudal pulse trains emitted by the varously-sized sources may vary a little bit with respect to each other as earlier discussed. But in the composite seismic signal generated by the array, the undesired caudal pulses will not, in general, cancel (complete cancellation being the ultimate desideratum). At best, they will only have a tendency not to reinforce each other relative to the desired initial pulse.

The literature abounds with descriptions of source arrays and configurations designed to suppress the caudal pulse train relative to the initial impulse. Two patents of interest are U.S. Pat. No. 3,602,878 to Sullivan for "A Method and Apparatus for Generating Seismic Waves" and U.S. Pat. No. 3,893,539, to Mott-Smith for a "Multiple Air Gun Array of Varied Sizes with Individual Secondary Oscillation Suppression." Use of a three-gun array is also discussed in the United Geophysical Corporation Handbook cited supra.

In another aspect of the prior art, it is well known that shallow earth layers are most readily detected by use of seismic acoustic sources rich in relatively high frequencies (100 Hz and up). On the other hand, deeper strata are best surveyed using relatively low frequency sources in the range of about 10-40 Hz. In the course of a single survey, both shallow and deep earth layers may be surveyed by using two sources, each having a different dominant frequency content. The two sources are fired separately, first one and then the other in a desired alternate sequence. The seismic reflection returns resulting from the alternate firings of the separate sources are recorded in corresponding separate records. The separate records are not combined. The two (or more) sources are usually different species of the same genus such as a large and a small air gun. For example, see U.S. Pat. No. 3,744,021 to Todd for an "Offshore Seismic Exploration Method".

The two sources may also be selected from different genera. See for example U.S. Pat. No. 3,351,899 to Luehrman for a "Programmed Multiple Shot Source System and Method." Luehrman provides an exploding-gas gun and an arcer or sparker. The two sources are separately fired at programmed intervals, in alternate sequence. Separate seismic recordings are made corresponding to each source. Considerable pains are taken in the above patent to record reflection data from one source or from the other source, but not from both at the same time. In fact, Luehrman teaches that it is highly detrimental to fire the sources substantially simultaneously.

SUMMARY OF THE INVENTION

It is an object of this invention to improve the signal to noise ratio of a composite seismic acoustic signal generated by an array of generically different seismic signal sources.

In accordance with an aspect of the invention, a seismic survey is conducted using an array of two or more seismic sound sources that are selected from different genera of such sources. The individual signal pressure-signatures resulting from the firing of each of the sources are incoherent with respect to one another except for the initial impulse.

In accordance with another aspect of this invention, the signal sources are fired substantially simultaneoulsy so that the two signals blend together to form a composite signal having a reinforced initial impulse with suppressed caudal pulses.

Other objects, features and advantages will be apparent from the drawings and the following detailed description.

DETAILED DESCRIPTION OF THE PREFERRED EMBODIMENT

Figure 1:
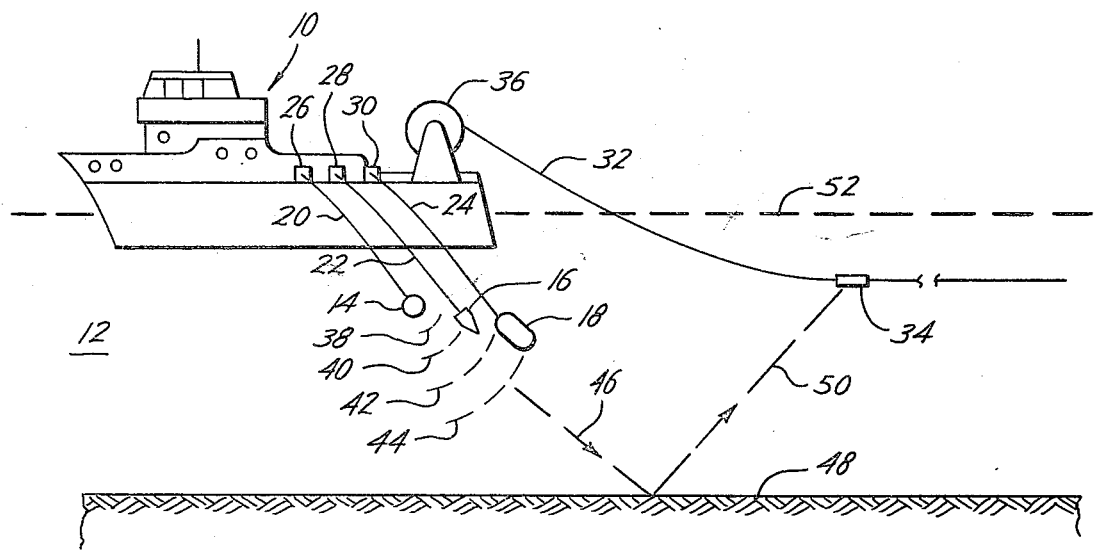
FIG. 1 is a schematic showing of a marine seismic system utilizing the principles of the invention.

Referring now to FIG. 1 there is shown a seismic exploration ship 10, sailing over a body of water 12 towing generically different seismic acoustic sources 14, 16, 18 from corresponding tow cables 20, 22, 24. The tow cables are suspended from suitable booms or davits 26, 28, 30 well known to the art. A streamer cable 32, including a plurality of hydrophones (only one of which, hydrophone 34, is shown for simplicity) is towed behind ship 10 from cable reel 36 mounted on the stern of the ship. Periodically, seismic sources 14, 16, 18 emit acoustic pulses 38, 40, 42 which blend together or coalesce to form a single wavefront 44 which propagates downwardly along ray path 46 to be reflected from an earth layer 48. Reflected ray 50 returns towards the water surface 52 and is detected by a hydrophone such as 34.

Figure 2:
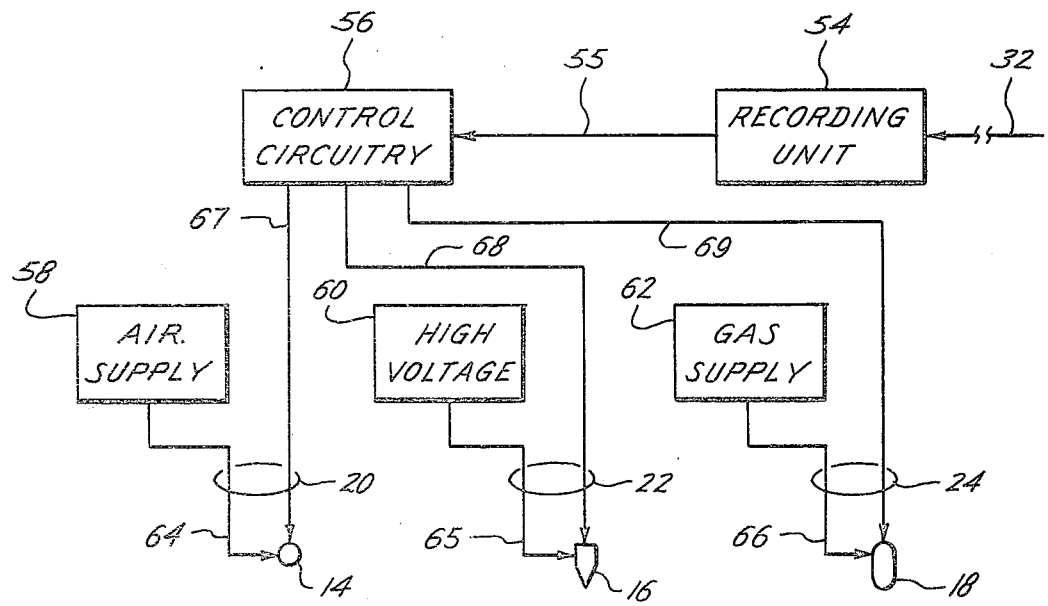
FIG. 2 is a block circuit diagram disclosing selected elements of the system of the invention.

Aboard ship 10 and shown in FIG. 2, but not shown in FIG. 1, are a multichannel recorder unit 54, gun control circuitry 56, and sources of energy to supply sound sources 14, 16, 18. In operation, when the recording unit 54 is prepared to make a seismic reflection record, it sends a command over line 55 to control circuitry 56 to fire seismic acoustic sources 14, 16, 18 thereby to cause each source to generate an accustic impulse. Reflected signals received by the hydrophones such as 34, are transmitted back to recording unit 54 over cable 32 where they are processed and recorded on an archival storage means such as a magnetic tape.

Seismic acoustic sources 14, 16, 18 are generically different. Source 14 might be an air gun such as described in U.S. Pat. application Ser. No. 749,548 now U.S. Pat. No. 4,114,273, assigned to the assignee of this invention. Source 16 might be a sparker such as disclosed in U.S. Pat. No. 3,369,217. Source 18 could be a sleeve-type exploding-gas gun such as taught by U.S. Pat. No. 3,620,327, 3,601,217 or 3,592,287, all of which are assigned to the assignee of this invention.

Since each of the sources is generically different, each must have its own energy supply: A compressed air supply 58 for source 14, a high voltage capacitor bank 60 for source 16 and a supply of oxygen and propane 62 for source 18. All of these supplies are, of course mounted aboard ship 10 although they are not shown in FIG. 1. The desired forms of energy as well as the control signals of the various guns are delivered over suitable conduits 64, 66 and electrical conductors 65, 67, 68, 69 that are included in towing cables 20, 22, 24.

Control circuitry 56 includes fire-time delay means for each type of seismic source to compensate for time lags that may be inherent in the fire-control mechanisms peculiar to each seismic source. Furthermore, for practical operational reasons, the seismic sources are often substantially offset from one another, in-line with the seismic cable 32 and hydrophones such as 34.

As pointed out earlier, the caudal pulses (a better term is caudal transients) resulting from an array of generically similar seismic sources will not, in general, cancel. The best that can be expected is that they will not reinforce. To achieve the best ratio between the amplitude of the initial impulse and the subsequent caudal transients, a large number of sources must be used particularly when they are all of the same genus. For optimum results, it is necessary to use, for example, one or possibly a very small number of the largest source to be used and increasingly many of each of the smaller sizes so that the caudal transients will combine into a relatively unstructured time zone of white noise of fairly uniform amplitude.

For signals from generically different seismic sources, the shapes and spacings of the caudal transients are incoherent with respect to one another. It is thus possible to select suitable combinations of two, three, or possibly more generically different sources, all having approximately equal initial pulse strengths but totally different caudal transients. By judicious selection of different sources, the caudal transients embedded in the respective output signals will cancel each other in whole or in part. The result of such a combination of diverse sources is that the amplitude ratio between the initial pulse and that of the aggregate caudal transients will be maximized without using the large number of sources that is required when all sources are of the same genus.

From the viewpoint of mathematics, the number of degrees of freedom available through the use of generically different sources is substantially greater for a given number of sources than is the case when all sources are of the same genus. It is well known in the mathematical arts that desired functional forms may be attained to a greater degree of accuracy when more degrees of freedom are available. In the seismic reflection art the desired form of a source pulse is a unit impulse function or a band-limited form thereof. Such an ideal form is more readily and more practicably attained with a combination of sources from different genera.

Figure 3:
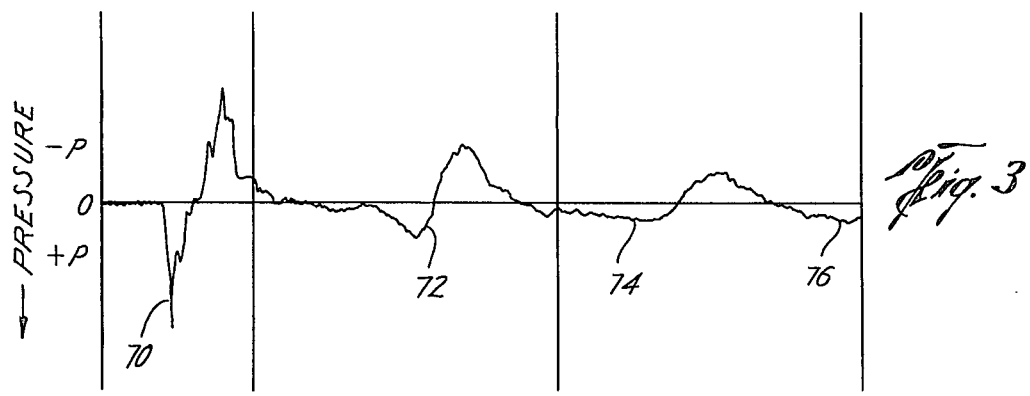
FIG. 3 is a pressure vs time plot or pressure signature for an air gun.
Figure 4:
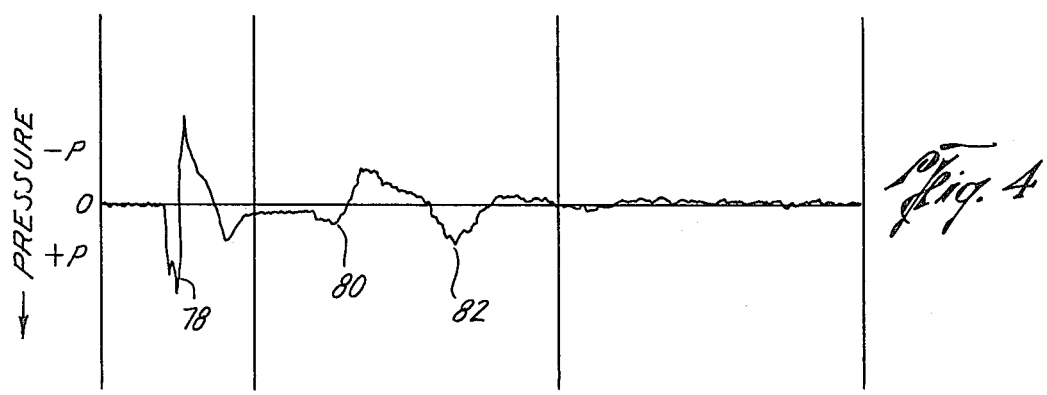
FIG. 4 is the pressure signature for a sleeve-type gas exploder source.

FIG. 3 and FIG. 4 represent the pressure signatures of the signals emitted by an air gun and a sleeve-type gas exploder respectively. The air gun signature of FIG. 3 shows an initial pulse 70, followed by bubble pulses 72, 74, 76. The gas exploder signature has an initial impulse 78 followed by two relatively weak caudal pulses 80 and 82, probably due to the collapse of the rubber sleeve against the solid inner core of the gun after it has been fired.

Figure 5:
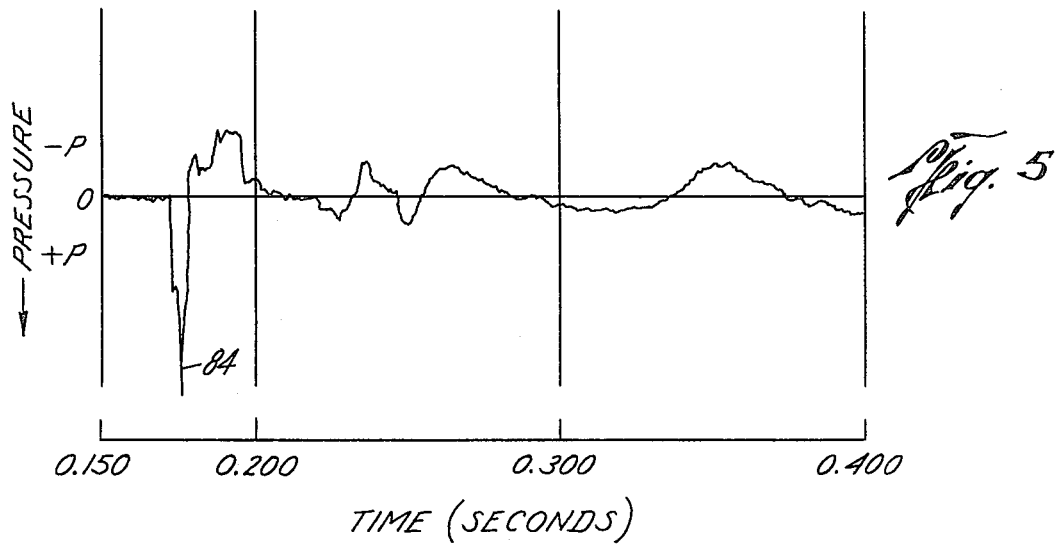
FIG. 5 is a combination of the pressure signatures of FIG. 3 and FIG. 4.

In FIG. 5, the two signatures have been combined. The combined signature includes an enhanced initial impulse 84. Some of the air gun bubble pulses have combined destructively with the gas gun after-pulses to materially reduce the average amplitude of the caudal transients. From FIG. 5 it clear that the blended signal from two or more generically different sources reduces the complexity of the outgoing seismic wave front and tends to reduce the overshoot following the initial impulse. The ratio between the initial pressure peak and the subsequent pressure maxima of the caudal transients has been increased by about 3 to 5 dB.

In the illustrations, each generically different seismic source has been represented by a single unit. It will be evident to those skilled in the art that multiple-unit arrays of the various genera of seismic sources may be used. Either a number of units from each genus may be grouped in separate arrays or the various units may be interlaced in one large array. Although only three specific genera of seismic sources were exemplified, other types not mentioned may be included.

The scope invention is not limited to the foregoing description which is an exemplary embodiment only and is limited only by the appended claims.

I claim as my invention:

1. A seismic exploration system comprising:
    a plurality of generically-different spaced-apart seismic acoustic sources;
    means for actuating said seismic sources so that the signals from the respective seismic sources blend into a single composite seismic wave;
    means for detecting said composite seismic wave; and
    means for producing a single seismic recording from said detected composite seismic wave.

2. A seismic exploration system as defined in claim 1 including means for actuating said generically different seismic sources substantially simultaneously.

3. A seismic exploration system as defined in claim 1 wherein said actuating means includes means for selectively delaying the respective actuations of said seismic sources to compensate for the different inherent firing-time to initial impulse delays among said generically different seismic sources.

4. A seismic exploration system as defined in claims 2 or 3 wherein said seismic sources are selected from source genera having output-signal pressure signatures whose initial impulses are coherent and whose unwanted caudal transients are incoherent relative to one another so that at least some of said unwanted caudal transients are substantially cancelled from said composite seismic wave.

* * * * *